# United States Patent [19]
Almoguera et al.

[11] 3,793,045
[45] Feb. 19, 1974

[54] YELLOW TITANIUM DIOXIDE CRYSTALS

[75] Inventors: Antonio Lorenzo Almoguera, Bilbao, Spain; Barrie H. Bieler; David C. Morgan, both of Walnut Creek, Calif.

[73] Assignee: The Dow Chemical Company, Midland, Mich.

[22] Filed: Oct. 13, 1972

[21] Appl. No.: 297,469

[52] U.S. Cl. .............. 106/300, 106/308 B, 106/309
[51] Int. Cl. ............................................. C09c 1/36
[58] Field of Search ..... 106/300, 308 B, 309, 288 B

[56] References Cited
UNITED STATES PATENTS 3,253,939  5/1966  Durrant et al. ..................... 106/300
3,022,186  2/1962  Hurd .................................. 106/300

*Primary Examiner*—Delbert E. Gantz
*Assistant Examiner*—J. V. Howard
*Attorney, Agent, or Firm*—Stephen S. Grace

[57] ABSTRACT

Yellow titanium dioxide crystals are produced by admixing titanium dioxide with lithium molybdate and aluminum oxide, and heating the resultant mixture above the melting point of the lithium molybdate. The resultant yellow titanium dioxide crystals can be water leached to remove any lithium molybdate coating thereon. These crystals are useful as a yellow paint pigment.

8 Claims, No Drawings

YELLOW TITANIUM DIOXIDE CRYSTALS

BACKGROUND OF THE INVENTION

Current inorganic yellow pigments, for example, used in paint formulations, contain heavy metals such as lead, antimony or cadmium. Materials containing heavy metals such as these have come under increasing disfavor. Increased emphasis on safety and environment has pointed out the desirability of having a yellow pigment which does not contain any of these undesirable heavy metals.

It is an object of the present invention to provide such a product and a method for making same.

Titanium dioxide is often used as a pigment component. It has been suggested to alter its normal bright, white color by the addition of additives. For example, U.S. Pat. No. 3,253,939 discloses a method for producing a gray titanium dioxide by the addition of molybdic acid or ammonium molybdate, and aluminum sulfate or aluminum nitrate and heating the resultant mixture.

THE INVENTION

The present invention relates to a method of treating titanium dioxide to produce yellow titanium dioxide crystals. This product is achieved by admixing titanium dioxide with lithium molybdate and aluminum oxide or aluminum hydroxide and heating the resultant mixture in an oxidizing atmosphere at a temperature within the range of from about the melting point of lithium molybdate (705°C) to about 1,300°C. These yellow titanium dioxide crystals have a rutile structure and range in size from about one-half micron to 2 millimeters in length depending on the relative proportions of materials in the mixture and the process conditions actually employed. The mixture containing the crystals is cooled, the crystals water leached to remove any lithium molybdate coating on the crystal surface and the crystals dried. In some instances in order to obtain a powder like product some form of milling of the cooled mixture is necessary.

In carrying out the method of the present invention a variety of titanium dioxide sources can be employed including rutile and anatase finished pigments, titanium dioxide recovered from ore processing, and titanium hydrate. Lithium molybdate, a translucent pale yellow salt, is made by fusing a stoichiometric mixture of lithium carbonate and molybdenum trioxide. Upon heating this mixture a very fluid pale yellow molten salt is formed after the decomposition of the lithium carbonate. After holding the mixture at a time sufficient to insure complete reaction the batch is cooled and the solid salt crushed to produce a powder. The source of aluminum oxide can be any of the variety of oxides or oxyhydroxides of aluminum including aluminum hydroxide.

When used herein the term "weight per cent" refers to the weight percentage of the material indicated based on the total weight of the mixture.

The titanium dioxide-lithium molybdate-aluminum oxide mixture is prepared by adding the three dry powders together or admixing a slurry of these materials and drying the slurry. The aluminum oxide is added in an amount from about 0.1 to about 2 weight per cent. The amounts of titanium dioxide and lithium molybdate can each vary from about 0.1 to about 99.9 weight per cent. Actual examples indicate that small amounts of lithium molybdate, in combination with aluminum oxide, will transform the titanium dioxide crystals to the yellow color. Large amounts of lithium molybdate can be employed to grow large titanium dioxide crystals (essentially in a bath of molten lithium molybdate) having the yellow coloring. One optional additive to the mixture as a dopant to increase the color centers or deepen the resultant crystal color is ferric oxide added in an amount from about 0.1 to about 0.6 per cent; amounts in excess of 0.6 per cent ferric oxide tend to produce a darkened brownish color to the titanium dioxide crystals. A second optional additive, giving like effect, is to add 0.1 to 4 per cent lithium fluoride to the beginning formulation. A preferred mixture which produces yellow titanium dioxide crystals of a size and color especially useful in preparing a paint pigment formulation is one which contains from about 2 to about 4 per cent lithium molybdate, from about 0.5 to 1 per cent aluminum oxide, from about 0.4 to about 0.6 per cent ferric oxide and from about 97.1 to about 89 per cent titanium dioxide.

With regard to the aluminum oxide less than 0.1 per cent added has very little effect on the color transformation. Amounts in excess of 2 per cent do not greatly deepen or change the yellow color of titanium dioxide crystals.

The mixture is heated in an oxidizing atmosphere in order to prevent the formation of $Ti^{+++}$. Temperatures from the melting point of lithium molybdate (705°C) to about 1,300°C are employed. Preferably the mixture is heated at a temperature of from about 800°C to about 950°C. The time of heating can vary depending on the amount of mixture present, proportions of the raw materials, crystal size and deepness of color desired. Temperatures on the order of 1 minute to 88 hours have been employed. Preferably the time of heating is from about 30 to about 120 minutes.

The heated mixture containing the yellow titanium dioxide crystals is cooled. Depending on the initial proportions of the raw materials the cooled admixture may be in a somewhat aggregate form or a solid mass containing the yellow crystals. The mixture can be treated to produce a loose aggregate of yellow titanium dioxide crystals by water leaching the cooled mixture to remove the lithium molybdate which may be coating or surrounding the titanium dioxide crystals. In some instances, where small amounts of lithium molybdate have been used in the initial raw material mixture, milling, such as ball milling or fluid energy milling, is required to particulate the mixture so that the water leaching procedure will be more effective. The titanium dioxide crystals are then dried.

The titanium dioxide yellow crystals produced by the present method have been evaluated as a yellow pigment component in a paint formulation. This product is found to be comparable to several of the presently commercial inorganic yellow pigments.

The following examples are illustrative of the method and product of the present invention.

A series of mixtures were prepared containing rutile, 10% lithium molybdate and varying amounts of aluminum oxide. These mixtures were heated for about 24 hours at 1,225°C. The resultant titanium dioxide crystals were visually inspected for change in color. With no aluminum oxide added the crystal color was observed to be an off white with a pale tan tint. The addition of 0.05 weight per cent aluminum oxide produced a very pale yellow crystal color. A much more distinctive pale yellow color was noted when 0.1% aluminum oxide was added to the mixture. A light yellow color was noted when 0.5 weight per cent aluminum oxide was admixed. When 1%, 2% and 5% aluminum oxide amounts were employed with the titanium dioxide-lithium molybdate mixtures a deep yellow color — essentially independent of $Al_2O_3$ content— of the resultant titanium dioxide crystals was observed.

Various mixtures and proportions of titanium dioxide, lithium molybdate and aluminum hydroxide (used as the source of aluminum oxide) and in some instances ferric oxide ($Fe_2O_3$) were prepared and heated to produce titanium dioxide crystals of various yellow coloring. The table below indicates the composition of the mixtures and the heating time and temperature.

The choice of reaction vessel compositions to be employed depends on the fusion temperature. Gas tight mullites (3 $Al_2O_3 \cdot 2SiO_2$) are operable at temperatures in the range of 700°–900°C. but preferably not above 800°C. Alpha alumina (impervious) can be used at 800°–1000°C., but preferably not above about 900°C. Platinum can be used at the lower temperatures and must be used above about 1,000°C.

TABLE

| Example No. | $TiO_2$ | $Li_2MoO_4$ | $Al(OH)_3$ | $Fe_2O_3$ | Temperature °C | Time Hrs. |
|---|---|---|---|---|---|---|
| 1 | 49 | 49 | 1.0 | 1.0 | 725 | ½ |
| 2 | 64 | 35 | 1.0 | 0.1 | 880 | 2 |
| 3 | 90 | 10 | 1.0 | — | 970 | 2 |
| 4 | 96 | 2 | 2 | — | 920 | 2 |

Crystal size for these runs ranged from one-half to 8 microns. An analysis of the composition of the resultant yellow titanium dioxide crystals indicated that the molybdenum and aluminum from the raw materials were present in the rutile structure of the titanium dioxide. Very little of the lithium was contained in the resultant structure.

Experiments were also made using titanium hydrate as the source of titanium dioxide. This results in a smaller particle size for the resultant titanium dioxide crystals. Several examples containing about 49% titanium hydrate, 49% lithium molybdate, 0.5 to 1% ferric oxide and 1% aluminum hydroxide were heated at 725°C for 30 minutes. In each case a yellow colored pigment was produced with particle sizes on the order of 1 micron or less.

A mixture of titanium hydrate (64%), lithium molybdate (35%), aluminum hydroxide (1%) and ferric oxide (0.1%) was admixed and heated to a temperature of 880°C for 2 hours. Another example was prepared containing 89% titanium hydrate, 10% lithium molybdate and 1% aluminum hydroxide. This sample was heated to 970°C for 2 hours. Still another example was prepared containing 93.8% titanium hydrate, 3.8% lithium molybdate, 1% lithium fluoride, 1% aluminum hydroxide and 0.4% ferric oxide was admixed and heated to a temperature of 850°C for 2 hours. In all cases the resultant rutile crystals were yellow in color.

In like manner other mixtures of titanium dioxide, lithium molybdate and aluminum oxide were prepared and heated to produce the yellow titanium dioxide crystals in accordance with the method of the present invention.

What is claimed is:
1. A method which comprises:
    a. mixing titanium dioxide, lithium molybdate and from about 0.1 to about 2 per cent aluminum oxide; and
    b. heating the mixture in an oxidizing atmosphere to a temperature within the range from about the melting point of lithium molybdate to about 1,300°C, thereby producing yellow titanium dioxide crystals.
2. The method of claim 1 including the additional steps of water leaching the titanium dioxide crystals to remove any lithium molybdate coating thereon and drying the crystals.
3. The method of claim 2 wherein the titanium dioxide crystals are milled prior to water leaching.
4. The method of claim 1 wherein the mixture also contains from about 0.1 to about 0.6 per cent of ferric oxide.
5. The method of claim 1 wherein the mixture also contains from about 0.1 to 4 per cent lithium fluoride.
6. The method of claim 5 wherein the mixture comprises from about 2 to about 4 per cent lithium molybdate, from about .1 to 4 per cent lithium fluoride, from about 0.5 to 1 per cent aluminum oxide, from about 0.4 to 0.6 per cent ferric oxide and from about 97 to about 90.4 per cent titanium dioxide.
7. The method of claim 1 wherein the heating is carried out at a temperature of from about 800° to 950°C.
8. The yellow titanium dioxide crystal product produced by the method of claim 1.

* * * * *